United States Patent Office 3,644,354
Patented Feb. 22, 1972

3,644,354
5-SUBSTITUTED-2,3-DIHYDROIMIDAZO [1,2-c]QUINAZOLINES
Goetz E. Hardtmann, Florham Park, and Hans Ott, Convent Station, N.J., assignors to Sandoz-Wander, Inc., Hanover, N.J.
No Drawing. Filed Sept. 16, 1968, Ser. No. 760,054
Int. Cl. C07l 57/12
U.S. Cl. 260—247.5 R           31 Claims

ABSTRACT OF THE DISCLOSURE

The invention discloses 5-N-substituted-2,3-dihydroimidazo[1,2-c]quinazolines, e.g., 5-diallylamino-8,9-dimethoxy-2,3-dihydroimidazo[1,2-c]quinazoline, which are pharmaceutically active and useful, for example, as hypotensive agents and as coronary dilators. Also disclosed are processes involved in preparation of said 2,3-dihydroimidazo[1,2-c]quinazolines employing intermediates which are 5-chloro-2,3-dihydroimidazo[1,2-c]quinazolines and 2-chloro-4-ethylenimino-quinazolines.

---

The present invention relates to 2,3-dihydroimidazo-[1,2-c]quinazolines having the 5-position a substituent containing carbon and hydrogen and joined to the imidazo-[1,2-c]quinazoline by a nitrogen atom of said substituent, and to pharmaceutical compositions incorporating said imidazo[1,2-c]quinazolines. The invention also relates to preparation of said imidazo[1,2-c]quinazolines from intermediates which are 5-chloro-2,3-dihydroimidazo[1,2-c] quinazolines which in turn may be obtained from intermediates which are 2-chloro-4-ethylenimino-quinazolines. The invention also relates to a novel process for preparing certain intermediates useful in preparation of the compounds of the invention.

An object of the present invention is to provide novel pharmaceutically active derivatives of imidazo[1,2-c] quinazolines having in the 5-position a substituent attached to this tricyclic compound by a nitrogen atom. Another object is to provide novel 5-nitrogen-substituted-2,3-dihydroimidazo[1,2-c]quinazolines which are pharmaceutically active and especially as hypotensive agents or coronary dilators and pharmaceutical compositions incorporating said novel compounds. A further object is to provide new and useful processes and intermediates for preparation of said novel derivatives. Other objects and advantages will be apparent from the following description of the invention.

The novel derivatives of 2,3-dihydroimidazo[1,2-c] quinazolines of the invention may be represented structurally by the following Formula I:

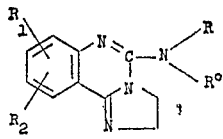

wherein

Each of R and R° is, independently, hydrogen,. lower alkyl, preferably of 1 to 4 carbon atoms, lower alkenyl, preferably of 1 to 4 carbon atoms, e.g., allyl; propargyl; di(lower)alkylamino(lower)alkyl wherein the lower alkyl is preferably of 1 to 4 carbon atoms, e.g.,

ω-di(lower)alkoxy(lower)alkyl wherein the lower alkoxy and lower alkyl preferably are of 1 to 4 carbon atoms, e.g.,

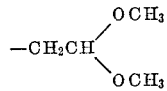

or R and R° together with the nitrogen attached to the nucleus form a heterocyclic ring having at least 5 but not more than 6 total ring atoms, at least 4 carbon atoms and not more than one other hetero atom, said hetero atom being from Group VIb of the Periodic Table, having an atomic weight not exceeding 33 and being equally spaced from said nitrogen by ethylene, i.e., —CH$_2$CH$_2$—; said ring preferably being a saturated ring, e.g., morpholino;

Each of R$_1$ and R$_2$ is, independently, hydrogen, halo of atomic weight of from 19 to 80; lower alkyl, preferably of from 1 to 4 carbon atoms; and lower alkoxy, preferably of from 1 to 4 carbon atoms.

A preferred method of preparation of compounds of Formula I involves the reaction of a 5-chloro-2,3-dihydroimidazo[1,2-c]quinazoline of Formula II

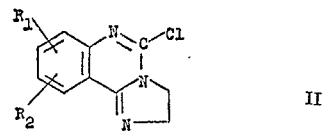

wherein R$_1$ and R$_2$ are as above-defined, with a compound of the Formula III:

wherein R and R° are as above-defined.

The production of compound I by reaction of a compound II with a compound III may be suitably carried out at temperatures in the range of 10° C. to 140° C., preferably 15° C. to 100° C. The reaction is conveniently carried out in an inert solvent reaction medium which, depending on the compounds III, is preferably either the compound III in the liquid state or an inert organic liquid. When compound III is normally gaseous or liquid, it is generally preferred to employ the liquefied or liquid compound III as the reaction medium. When compound III is solid, the reaction medium is provided by an inert organic liquid which may be conveniently any of several of the well-known and conventional organic solvents. Such inert organic solvents include, by way of illustration, the chlorinated hydrocarbons such as chloroform and methylene chloride, the lower alcohols such as ethanol, the aromatic solvents such as benzene and toluene, the ethers of both noncyclic and cyclic types such as dimethoxyethane and tetrahydrofuran, and the well-known amides such as dimethylacetamide, dimethylformamide and the like. The commonly preferred materials include chloroform and ethanol. The reaction producing compounds I may be carried out partly in suspension as well as in solution such that the solvent medium need not dissolve all of the reactants present, although it is of course preferred to have good solvent action. For this purpose one may employ co-solvents, for example, in conjunction with an excess of compound III, if desired. The product compounds I may be obtained from the reaction by working up by established procedures.

The compounds of Formula III are well known or can be readily prepared from available materials by known procedures.

The compounds of Formula II are novel compounds which are preferably prepared by a two step reaction sequence involving in the first Step A the reaction of a 2,4-dichloroquinazoline of Formula IV

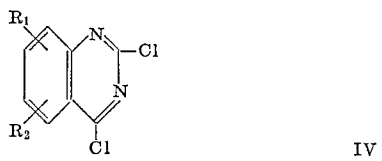

wherein $R_1$ and $R_2$ are as above-defined, with ethylene imine (aziridine) of the Formula V:

in an organic solvent to obtain a 2-chloro-4-ethylenimino-quinazoline of Formula VI:

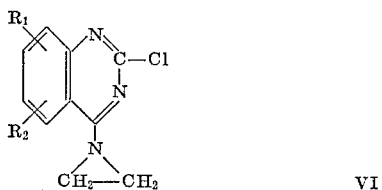

wherein $R_1$ and $R_2$ are as above-defined, said compound VI then being converted in a Step B to the corresponding compound of Formula II, preferably by reaction with a metal iodide in an inert solvent.

The preparation of compounds VI by the Step A reaction of a compound IV with a compound V is suitably carried out at temperatures in the range of 0° C. to 50° C., preferably 5° C. to 25° C. and at the lower range temperatures during the initial period. The reaction is desirably carried out in an inert solvent which may be any of the convenient well known nonhydroxylic organic solvents. The preferred solvents include those of both the aromatic and chlorinated hydrocarbon type, e.g., benzene and chloroform. An acid binding which may be any of the several well known types, preferably an alkali metal carbonate, e.g., potassium carbonate, is desirably employed in the reaction mixture. The product compounds of Formula VI, which are novel compounds, may be obtained from the reaction by working up by established procedures.

The preparation of compounds II from compounds VI by Step B is a rearrangement type reaction. The preferred method for preparation of compounds II involves the reaction of a compound VI with an alkali metal iodide, e.g., sodium iodide or potassium iodide, in an inert solvent medium. The reaction may be carried out at temperatures in the range of 10° C. to 100° C., preferably 15° C. to 50° C. The solvent for the reaction may be any of the convenient well known organic solvents which are nonhydroxylic and inert to the reaction. Examples of such inert solvents include acetone, dimethylacetamide, dimethylformamide, and dimethoxy ethane, preferably acetone. The compounds of Formula II may be obtained from the reaction by working up by established procedures.

The compounds of Formula II may be also produced in Step B by thermal rearrangement of compounds VI either in the presence or absence of a solvent and at temperatures in the range of at least 50° C. up to about 180° C., followed by working up and recovery by known procedures, preferably in an inert organic solvent of the type employed when compounds II are produced by the above-described preferred process involving reaction of a compound VI with an alkali metal iodide.

The 2,4-dichloroquinazolines of Formula IV employed as starting material in Step A, above, are either known or may be prepared from known materials by procedures which are established and described in the literature, for example, by Curd et al., J. Chem. Soc. 1948, 1759, and by Hess et al., J. Med. Chem. 11, 130–136 (1968). In the prior art processes the 2,4-dichloroquinazolines are produced by first cyclizing an anthranilic acid or ester with an alkali metal cyanate, preferably in acetic acid and at temperatures of 80° C. to 120° C., to obtain the corresponding quinazoline-2,4-dione which is then converted to the desired 2,4-dichloroquinazoline by reaction with phosphorus oxychloride, preferably at temperatures between 80° C. to 120° C. In carrying out such processes to obtain the 2,4-dichloroquanazolines it was found particularly advantageous to employ the appropriate lower alkyl (1 or 2 carbon atoms) ester of the anthranilic acid in preference to anthranilic acid itself.

Also within the scope of the novel compounds provided by the invention are pharmaceutically acceptable salts not materially affecting the pharmacological effect of the compounds of Formulae I and II. Such salts include the acid addition salts, e.g., the hydrochloride, fumarate, formate, acetate, citrate, sulfonate, malonate, tartrate, methane sulfonate, salicylate and hydrosulfate. The acid addition salts may be produced as desired from the corresponding free bases by conventional procedures. Conversely, the free bases may be obtained from the salts by procedures known in the art. Compounds I may exist as hydrates and as such are also within the scope of the invention.

The compounds of structural Formula I and their pharmaceutically acceptable acid addition salts are useful because they possess pharmacological activity in animals. In general, the compounds are useful as hypotensive agents, as indicated by a lowering of blood pressure on intravenous administration to the anesthetized dog (1–15 mg./kg. dosage). The compounds of the invention are also useful as coronary dilators, as indicated on intravenous administration to the anesthetized dog and measurement of blood flow through the anterior descending branch of the left coronary artery (1–15 mg./kg. dosage). For the above uses, the compounds may be combined with a pharmaceutically acceptable carrier, and such other conventional adjuvants as may be necessary, and administered orally in such forms as tablets, capsules, elixirs, suspensions and the like or parenterally in the form of an injectable solution or suspension. For the above-mentioned uses, the dosage administered will, of course, vary depending upon the compounds used, the therapy desired and the mode administration. However, in general, satisfactory results are obtained when administered at a daily dosage of from about .2 milligram to about 15 milligrams per kilogram of body weight, preferably given in divided doses 2 to 4 times a day, or in sustained release form. For most mammals the administration of from about 10 milligrams to about 100 milligrams of the compound per day provides satisfactory results and dosage forms suitable for internal administration comprise from about 3 milligrams to about 50 milligrams of the compound in admixture with a solid or liquid pharmaceutical carrier or diluent.

Of particular interest are the compounds of Formula I, which in addition to being useful as coronary dilators, are also useful as nitrate potentiators as indicated in the above-indicated coronary dilation test employing 20 mcg./kg. of nitroglycerin administered intravenously following the compound of Formula I. Compounds of Formula I found to exhibit such potentiation are those in which one or both of R and and R° is an acylic unsaturated hydrocarbon radical and especially where R and R° represent diallyl with $R_1$ and $R_2$ represents 8,9-dimethoxy. Certain other of the compounds within the scope of Formula I also exhibit this capability, for example, in the case where R and R° together form morpholino and in the situation where R and R° are ethyl with $R_1$ and $R_2$ representing 8,9-dimethoxy. Dosages and modes of administration with the appropriate compounds of Formula I as nitrate potentiators are similar to those indicated above for use as coronary dilators. As potentiators, the compounds of Formula I may be employed in conjunction with any of the well-known nitrate dilators, e.g., nitroglycerin and isosorbide dinitrate.

The generally preferred compounds of Formula I have $R_1$ and $R_2$ together representing 8,9-dimethoxy with particular mention being made of such compounds in which both R and R° is ethyl and in which both of R and R° is allyl.

For above usages, oral administration with carriers may take place in such conventional forms as tablets, dispersible powders, granules, capsules, syrups and elixirs. Such compositions may be prepared according to any method known in the art for the manufacture of pharmaceutical compositions, and such compositions may contain one or more conventional adjuvants, such as sweetening agents, flavoring agents, coloring agents and preserving agents, in order to provide an elegant and palatable preparation. Tablets may contain the active ingredient in admixture with conventional pharmaceutical excipients, e.g., inert diluents such as calcium carbonate, sodium carbonate, lactose and talc, granulating and disintegrating agents, e.g., starch and alginic acid, binding agents, e.g., starch, gelatin and acacia, and lubricating agents, e.g., magnesium stearate, stearic acid and talc. The tablets may be uncoated or coated by known techniques to delay disintegration and adsorption in the gastrointestinal tract and thereby provide a sustained action over a longer period. Similarly, suspensions, syrups and elixirs may contain the active ingredient in admixture with any of the conventional excipients utilized for the preparation of such compositions, e.g., suspending agents (methylcellulose, tragacanth and sodium alginate), wetting agents (lecithin, polyoxyethylene stearate and polyoxyethylene sorbitan monooleate) and preservatives (ethyl-p-hydroxybenzoate). Capsules may contain the active ingredient alone or admixed with an inert solid diluent, e.g. calcium carbonate, calcium phosphate and kaolin. The preferred pharmaceutical compositions from the standpoint of preparation and ease of administration are solid compositions, particularly hard-filled capsules and tablets.

A representative formulation is a tablet prepared by conventional tabletting techniques and containing the following ingredients:

| Ingredients: | Weight (mg.) |
| --- | --- |
| 5-diallylamino-8,9-dimethoxy-2,3-dihydroimidazo[1,2-c]quinazoline | 25 |
| Tragacanth | 10 |
| Lactose | 197.5 |
| Corn starch | 25 |
| Talcum | 15 |
| Magnesium stearate | 2.5 |

Compounds of Formula II are also useful because of pharmacological activity in animals. More particularly, the compounds II are useful as analeptic agents as indicated by exhibiting hexobarbital antagonism when administered interperitoneally to the mouse at dosages of 5–50 mg. per kg. of body weight. Such compounds of Formula II may be employed in dosage forms and modes of administration similar to compounds of Formula I with satisfactory daily dosages generally being in the range of from 0.1 to 50 mg./kg. of body weight and with individual dosages for intravenous administration to large mammals being from 10 to 500 mg.

The following examples show representative compounds encompassed within the scope of this invention and the manner in which such compounds are prepared. However, it is to be understood that the examples are for purposes of illustration only and are not intended as in any way limiting the scope of the invention which is defined in the appended claims.

EXAMPLE 1

5-amino-2,3-dihydro-imidazo[1,2-c]quinazoline

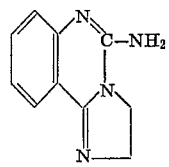

Step A: Preparation of 2-chloro-4-ethylenimino-quinazoline.—To an ice cold suspension of 160 g. of 2,4-dichloroquinazoline and 65 g. of anhydrous potassium carbonate in 1.6 liters of absolute benzene is added 88 ml. of ethylenimine. The resulting mixture was stirred for 30 minutes at 5–10° C. and then for 16 hours at room temperature. The resulting mixture was evaporated in vacuo to remove solvent, the crude residue taken up in methylene chloride, filtered to remove inorganic solids, and the organic phase then washed twice with 200 ml. of saturated sodium chloride solution, dried over anhydrous sodium sulfate, and evaporated in vacuo to obtain a residue which is crystallized from ethanol to obtain 2-chloro-4-ethylenimino-quinazoline, M.P. 117° C.

Step B: Preparation of 5-chloro-2,3-dihydroimidazo[1,2-c]quinazoline.—To a solution of 135 g. of 2-chloro-4-ethylenimino-quinazoline in 2 liters of absolute acetone is added with stirring 13.5 g. of sodium iodide. There is then added 100 ml. of methylene chloride as co-solvent to obtain a clear solution and the resulting mixture stirred for 1 hour at room temperature. The mixture is evaporated to dryness, the residue dissolved in methylene chloride and this mixture washed three times with 200 ml. of saturated sodium chloride solution. The organic phase is dried over sodium sulfate, evaporated in vacuo and this residue crystallized from methylene chloride/acetone (1:1) to obtain 5-chloro-2,3-dihydroimidazo[1,2-c]quinazoline, M.P. 206–209° C.

Step C: Preparation of 5-amino-2,3-dihydroimidazo[1,2-c]quinazoline.—A 100 ml. steel bomb containing 10.5 g. of 5-chloro-2,3-dihydroimidazo[1,2-c]quinazoline is cooled in a Dry Ice-acetone bath to minus 60–70° C. There is then introduced dry ammonia under anhydrous conditions until 80–85 ml. of ammonia is condensed. The sealed bomb is then heated for 18 hours at temperature of 75° C. in an oil bath, then cooled to room temperature, pressure released slowly to evaporate excess ammonia, and the residue dissolved in chloroform. The solution is washed twice with 100 ml. of water, dried and evaporated in vacuo. The residue is crystallized from absolute ethanol to obtain 5-amino-2,3-dihydroimidazo[1,2-c]quinazoline, M.P. 263–264° C.

EXAMPLE 2

5-diethylamino-2,3-dihydro-8,9-dimethoxy-imidazo[1,2-c]quinazoline

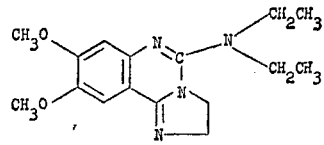

Step A: Preparation of 6,7-dimethoxy-quinazoline-2,4-dione.—To a suspension of 25 g. of methyl-4,5-dimethoxyanthranilate in 50 ml. of acetic acid is added dropwise at room temperature a solution of 15 g. of potassium cyanate in 20 ml. of water. The resulting paste is stirred for one hour at room temperature, then treated by addition of 250 ml. of water and followed by the addition dropwise over a period of 30 minutes of 400 ml. of 50% sodium hydroxide solution. The resulting paste was heated with stirring at temperature of 90° C. for two hours, then cooled, filtered, and the resulting residue dissolved in warm water, treated with charcoal, filtered and made acidic to form a precipitate which is recovered by filtering. The precipitate is washed with water until neutral and then further washed with methanol and diethyl ether to obtain 6,7-dimethoxy-quinazoline-2,4-dione, M.P. 246° C.

Step B: Preparation of 2,4-dichloro-,7-dimethoxy-quinazoline.—To a suspension of 23 g. of 6,7-dimethoxy-quinazoline-2,4-dione in 100 ml. of phosphorous oxychloride is added 10 ml. of N,N-dimethylaniline. The resulting mixture is refluxed for 4 hours to obtain a clear red solution which is evaporated in vacuo to dryness to obtain a solid residue which is taken up in benzene and again evaporated in vacuo to dryness. The resulting residue is then taken up in 300 ml. of methylene chloride and 15 ml. of triethylamine and this solution filtered through Celite, extracted twice with 2 N sodium hydroxide solution, 3 times with water and finally with saturated sodium chloride solution. The organic phase is evoporated in vacuo to obtain a red solid which is recovered by filtering. The solid is washed with ether and recrystallized from petrol ether to obtain 2,4-dichloro-6,7-dimethoxy quinazoline, M.P. 159–160° C.

Step C: Preparation of 2-chloro-4-ethylenimino-6,7-dimethoxy-quinazoline.—To a mixture of 52 g. of crude 2,4-dichloro-6,7-dimethoxy-quinazoline in 800 ml. of benzene and 200 ml. of chloroform is added 60 g. of potassium carbonate and then with stirring is also added 25 ml. of ethylene imine. A precipitate forms and after 6 hours an additional amount of 10 ml. of ethylene imine is added and the mixture then allowed to stand at room temperature overnight. The resulting mixture is evaporated in vacuo and the residue treated with methylene chloride followed by filtering to remove insoluble material. The filtrate is evaporated in vacuo to dryness to obtain a crude product which is 2-chloro-4-ethylenimino-6,7-dimethoxy-quinazoline which may be recrystallized from methylene chloride/diethyl ether to obtain a crystalline solid which has a varying M.P. due to rearrangement at elevated temperatures but melts at 192° C. when inserted at 170° C.

Step D: Preparation of 5-chloro-2,3-dihydro-8,9-dimethoxy-imidazo[1,2-c]quinazoline.—To a solution of 58 g. of 2-chloro-4-ethylenimino-6,7-dimethoxy-quinazoline in one liter of acetone is added 60 g. of sodium iodide. The resulting mixture is refluxed for 3 hours and evaporated in vacuo to dryness. The residue is treated with chloroform and insoluble material separated by filtering. The filtrate is passed through 400 g. of aluminum oxides and resulting solution evaporated to dryness. The resulting residue is then crystallized from methylene chloride to obtain 5-chloro-2,3-dihydro-8,9-dimethoxy-imidazo[1,2-c]quinazoline, M.P. 185–187° C.

Step E: Preparation of 5-diethylamino-2,3-dihydro-8,9-dimethoxy-imidazo[1,2-c]quinazole.—A mixture of 10.5 g. of 5-chloro-2,3-dihydro-8,9-dimethoxy-imidazo[1,2-c]-quinazoline and 50 ml. of diethylamine is charged to a steel cylinder and heated at 75–85° C. for 16 hours. The cylinder is cooled, excess diethylamine evaporated and the resulting residue dissolved in chloroform. The resulting solution is washed with water, dried over anhydrous sodium sulfate, treated with charcoal, filtered and evaporated in vacuo to obtain a residue which is recrystallized from diethyl ether to obtain 5-diethylamino-2,3-dihydro-8,9-dimethoxy quinazoline, M.P. 123–125° C.

EXAMPLE 3

5-diallylamino-2,3-dihydroimidazo[1,2-c]quinazoline

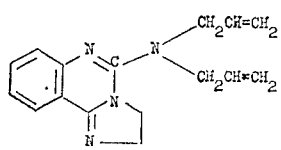

A suspension of 6 g. of 5-chloro-2,3-dihydroimidazo-[1,2-c]quinazoline in 60 ml. of diallylamine is formed at room temperature and the suspension heated briefly to reflux (about 5 min.). The mixture is cooled, evaporated to dryness and the residue dissolved in methylene chloride. The solution is then washed first with bicarbonate solution, then with water and finally with saturated sodium chloride solution. After drying over sodium sulfate, the solution is evaporated to dryness. The resulting residue is dissolved in diethyl ether, insoluble material filtered off and the ether partially evaporated in vacuo until crystallization occurs. The crystalline material is dissolved in methylene chloride containing about 2% methanol and filtered through a column of silica gel. The eluate is evaporated and the residue crystallized from diethyl ether to obtain 5-diallylamino-2,3-dihydroimidazo[1,2-c]quinazoline, M.P. 74–76° C.

EXAMPLE 4

5-morpholino-2,3-dihydroimidazo[1,2-c]quinazoline

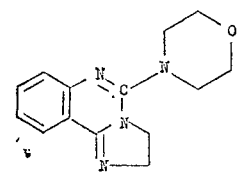

To an ice bath cooled suspension of 11 g. of 5-chloro-2,3-dihydro-8,9-dimethoxy - imidazo[1,2-c]quinazoline in 70 ml. methylene chloride is added quickly 30 g. of morpholine. The resulting mixture is stirred for 16 hours, additional methylene chloride added, and then refluxed. Chloroform is added to the resulting mixture and this mixture is heated to displace methylene chloride, and then the resulting chloroform mixture refluxed for 2 hours. The resulting mixture is then evaporated in vacuo and the residue dissolved in methylene chloride, washed once with 10% sodium bicarbonate solution, twice with sodium chloride solution, dried and evaporated in vacuo to a solid residue which is dissolved in methylene chloride/ethylacetate and crystallized therefrom by evaporation to obtain 5-morpholino-2,3-dihydroimidazo[1,2-c] quinazoline, M.P. 143–145° C.

EXAMPLE 5

Employing the appropriate compound of Formula III, i.e., HNRR°, as defined above, and the appropriate procedure of the preceding examples depending upon the state (liquid, solid, etc.) of compound III, as will be evident, the following product of the invention is obtained:

(a)

5-(3-dimethylaminopropylamino)-2,3-dihydroimidazo- [1,2-c]quinazoline, M.P. 121–123° C.
(Crystallization from ethyl acetate)
(Solvent: excess N,N-dimethylpropylene diamine)

(b)

5-diallyamino-8,9-dimethoxy-2,3-dihydroimidazo[1,2-c] quinazoline, M.P. 133–134° C.
(Crystallization from methylene chloride/diethyl ether)
(Solvent: ethanol)

(c)

5-amino-8,9-dimethoxy-2,3-dihydroimidazo[1,2-c]quinazoline, M.P. 257–258° C.
(Crystallization from ethanol)
(Solvent: excess ammonia)

(d)

5-dimethylamino-2,3-dihydroimidazo[1,2-c]quinazoline, M.P. 79° C.
(Crystallization from benzene/heptane)
(Solvent: excess dimethylamine and chloroform)

(e)

5-(2,2-dimethoxyethylamino)-2,3-dihydroimidazo[1,2-c]quinazoline, M.P. 140–141° C.
(Crystallization from methylene chloride/ethyl acetate)
(Solvent: chloroform)

(f)

8,9-dimethoxy-5-dimethylamino-2,3-dihydroimidazo-[1,2-c]quinazoline, M.P. 177–178° C.
(Crystallization from isopropanol)
(Solvent: excess dimethylamine and chloroform)

(g)

5-methylamino-2,3-dihydroimidazo[1,2-c]quinazoline, M.P. 229–230° C.
(Solvent: excess methylamine and chloroform)

(h)

8,9-dimethoxy-5-methylamino-2,3-dihydroimidazo[1,2-c]quinazoline monohydrate
(Crystallization from ethanol)
(Solvent: excess methylamine and chloroform)

(i)

5-ethylamino-2,3-dihydroimidazo[1,2-c]quinazoline, M.P. 189–190° C.
(Crystallization from methanol/ethyl acetate)
(Solvent: excess ethylamine and chloroform)

(j)

8,9-dimethoxy-5-ethylamino-2,3-dihydroimidazo[1,2-c]quinazoline monohydrate, M.P. 239.5–240.5° C.
(Crystallization from methanol/ethyl acetate)
(Solvent: excess ethylamine and chloroform)

(k)

5-allylamino-8,9-dimethoxy 2,3-dihydroimidazo[1,2-c]quinazoline, M.P. 209–211° C.
(Crystallization from methanol/diethyl ether)
(Solvent: excess allylamine)

What is claimed is:

1. A compound of the formula:

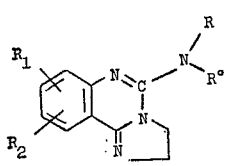

wherein
each of R and R° is, independently, hydrogen, lower alkyl; lower alkenyl; propargyl; di(lower)alkylamino(lower(alkyl);
ω-di(lower)alkoxy (lower)alkyl;
or R and R° together with the nitrogen attached to the nucleus form N-pyrrolidyl, piperidino, morpholino or thiomorpholino; and
each of $R_1$ and $R_2$ is, independently, hydrogen, fluoro, chloro, bromo; lower alkyl; or lower alkoxy;

and pharmaceutically acceptable acid addition salts thereof

2. A compound of claim 1 in which $R_1$ and $R_2$ represent 8,9-lower dialkoxy.
3. A compound of claim 2 in which $R_1$ and $R_2$ represent 8,9-dimethoxy.
4. A compound of claim 1 in which R is lower alkenyl and R° is hydrogen or lower alkenyl.
5. A compound of claim 4 in which R is allyl and R° is hydrogen or allyl.
6. A compound of claim 5 in which $R_1$ and $R_2$ represent 8,9-dimethoxy.
7. A compound of claim 1 in which R is dialkylaminoalkyl and R° is hydrogen or dialkylaminoalkyl.
8. A compound of claim 7 in which $R_1$ and $R_2$ represent 8,9-dimethoxy.
9. A compound of claim 7 in which R is dimethylaminopropyl and R° is hydrogen.
10. A compound of claim 9 in which $R_1$ and $R_2$ represent 8,9-dimethoxy.
11. A compound of claim 1 in which R is lower alkyl and R° is hydrogen or lower alkyl.
12. A compound of claim 11 in which $R_1$ and $R_2$ represent 8,9-dimethoxy.
13. A compound of claim 11 in which R° is hydrogen.
14. A compound of claim 13 in which R is methyl or ethyl.
15. A compound of claim 14 in which $R_1$ and $R_2$ represent hydrogen or 8,9-dimethoxy.
16. A compound of claim 11 in which R and R° are lower alkyl.
17. A compound of claim 16 in which R and R° are methyl.
18. A compound of claim 17 in which $R_1$ and $R_2$ represent 8,9-dimethoxy.
19. A compound of claim 16 in which R and R° are ethyl and $R_1$ and $R_2$ represent 8,9-dimethoxy.
20. A compound of claim 1 in which R is propargyl and R° is hydrogen or propargyl.
21. A compound of claim 20 in which R° is hydrogen.
22. A compound of claim 21 in which $R_1$ and $R_2$ represent 8,9-dimethoxy.
23. A compound of claim 1 in which R is ω-dialkyl and R° is hydrogen or ω-dialkoxyalkyl.
24. A compound of claim 23 in which R° is hydrogen.
25. A compound of claim 24 in which R is 2,2-dimethoxyethyl.
26. A compound of claim 25 in which $R_1$ and $R_2$ represent 8,9-dimethoxy.
27. A compound of claim 1 in which R and R° are hydrogen.
28. A compound of claim 27 in which $R_1$ and $R_2$ represent 8,9-dimethoxy.
29. A compound of claim 1 in which R and R° together with the nitrogen attached to the nucleus form morpholino.
30. A compound of claim 29 in which $R_1$ and $R_2$ represent 8,9-dimethoxy.
31. The compound of claim 6 in which R° is allyl.

References Cited

UNITED STATES PATENTS 2,963,480   12/1960   Taylor et al. _____ 260—256.4

ALEX MAZEL, Primary Examiner

R. J. GALLAGHER, Assistant Examiner

U.S. Cl. X.R.

260—247.1, 247.2 R, 251 Q, 256.1 F, 256.5 R; 424—248, 251